US008254849B2

(12) United States Patent
Pan et al.

(10) Patent No.: US 8,254,849 B2
(45) Date of Patent: Aug. 28, 2012

(54) FM RADIO FREQUENCY PLAN USING PROGRAMMABLE OUTPUT COUNTER

(75) Inventors: Tzu-wang Pan, Saratoga, CA (US); Yi Zeng, Fremont, CA (US); I-Hsiang Lin, Mountain View, CA (US); Pushp K. Trikha, San Diego, CA (US); Jeremy D. Dunworth, San Diego, CA (US); Rahul Apte, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 12/417,512

(22) Filed: Apr. 2, 2009

(65) Prior Publication Data

US 2010/0255802 A1 Oct. 7, 2010

(51) Int. Cl.
*H04B 1/06* (2006.01)

(52) U.S. Cl. ............... 455/76; 455/23; 455/85; 455/86; 455/87; 455/147; 375/375; 375/376; 331/16; 331/34; 331/117 FE (58) Field of Classification Search ............... 455/6, 77, 455/84, 85, 86, 87, 93, 142, 23, 7; 331/117 FE, 331/117 R, 167, 177 R, 177 V, 34, 36 C, 331/16, 182, 183, 185
See application file for complete search history.

(56) References Cited

U.S. PATENT DOCUMENTS

| | | | | |
|---|---|---|---|---|
| 5,483,686 A * | 1/1996 | Saka et al. ............... | 455/182.2 |
| 5,926,514 A * | 7/1999 | Meador et al. ............... | 375/346 |
| 6,476,684 B2 * | 11/2002 | Park ............... | 332/127 |
| 6,593,826 B2 * | 7/2003 | See ............... | 331/179 |
| 6,747,987 B1 * | 6/2004 | Meador et al. ............... | 370/465 |
| 7,471,940 B2 * | 12/2008 | Tuttle et al. ............... | 455/333 |
| 7,522,898 B2 * | 4/2009 | Heidari et al. ............... | 455/255 |
| 7,593,695 B2 * | 9/2009 | Jensen ............... | 455/76 |
| 7,881,692 B2 * | 2/2011 | Tuttle et al. ............... | 455/333 |
| 7,907,026 B2 * | 3/2011 | Hwang et al. ............ | 331/117 FE |
| 8,155,610 B2 * | 4/2012 | Elenes ............... | 455/205 |
| 2002/0193084 A1 | 12/2002 | Lim et al. | |
| 2008/0068098 A1 | 3/2008 | Fujii et al. | |
| 2008/0233892 A1 * | 9/2008 | Marholev et al. ............... | 455/77 |
| 2009/0160566 A1 * | 6/2009 | Mohammadi ............... | 331/1 R |
| 2009/0298453 A1 * | 12/2009 | Elenes ............... | 455/205 |
| 2010/0189194 A1 * | 7/2010 | Dawkins et al. ............... | 375/316 |

OTHER PUBLICATIONS

International Search Report & Written Opinion—US2010/029853—International Search Authority—European Patent Office—Jun. 2, 2010.

* cited by examiner

*Primary Examiner* — Linh Nguyen
(74) *Attorney, Agent, or Firm* — Kevin T. Cheatham (57) ABSTRACT

An FM radio with a wide frequency range operates in a cell phone without interfering with the VCO of the RF transceiver. The FM transceiver generates a VCO signal whose frequency varies by less than ±7% from the midpoint of a narrow first range. A synthesizer signal is generated by dividing the VCO frequency by a first divisor such that the synthesizer frequency varies over a lower frequency second range. The VCO frequency is also divided by a second divisor such that the synthesizer frequency varies over a third range. The upper limit of the second range falls at the lower limit of the third range. The lower limit of the second range is 85.5 MHz and the upper limit of the third range is 108.0 MHz. By also using a third divisor, a synthesizer signal with a range of 76-108 MHz is generated from the narrow first frequency range.

34 Claims, 6 Drawing Sheets

FM RADIO FREQUENCY PLAN USING PROGRAMMABLE OUTPUT COUNTER

BACKGROUND

1. Technical Field

The present disclosure relates to wireless communication systems, and more particularly to a mobile communication device that includes an FM radio transceiver.

2. Background Information

Wireless communication devices originally provided only the capability of voice communication. Now wireless communication devices have evolved from being only mobile telephones to providing other communication, information and entertainment capabilities. In addition to photography, computing and gaming functions, a currently available mobile communication device might also include a Bluetooth transceiver to communicate with an earpiece, a portable MP3 player, a global positioning system (GPS) unit, or a WiFi transceiver to enable communication via a LAN as opposed to over a cellular network. As additional communication functions are added, additional frequency synthesizers are required to generate the signals used to transmit and receive signals at the frequencies used by the various functions. For example, a cell phone that operates on the wideband CDMA 2100 (WCDMA) standard transmits and receives at the frequencies 2110-2170 MHz. The GPS unit on the cell phone receives positioning signals at 1575 MHz. The WiFi transceiver on the cell phone transmits and receives at 2412-2484 MHz. And the Bluetooth transceiver communicates with the earpiece using the frequencies 2620-2690 MHz.

As additional communication functions are added, however, the frequency synthesizers begin to interfere with one another. Where the frequency synthesizers generate their signals using inductor-capacitor (LC) tanks, the signals generated by each additional synthesizer can interfere with the inductors of the existing synthesizers. Where the frequency synthesizers generate their signals using ring oscillators, a large amount of power must be used to reduce the large amounts of phase noise that ring oscillators are known to produce. Because of the power constraints of battery-powered mobile communication devices, ring oscillators are typically avoided in synthesizer designs where low noise is required.

Thus, a design for a frequency synthesizer is desired that meets the power constraints of a battery-powered mobile communication device but yet that reduces the interference with the inductors of the other frequency synthesizers located on the same mobile communication device.

SUMMARY

An FM radio tuner with a wide frequency range operates in a mobile communication device without interfering with the voltage-controlled oscillator (VCO) of the RF transceiver. The FM transceiver generates a VCO signal whose high frequency varies over a narrow first frequency range. A synthesizer signal is generated by dividing the frequency of the VCO signal by a first divisor such that the frequency of the synthesizer signal varies over a lower second frequency range. The frequency of the VCO signal is also divided by a second divisor such that the frequency of the synthesizer signal varies over a lower third frequency range. The upper-limit frequency of the second frequency range falls at the lower-limit frequency of the third frequency range. In one embodiment, the lower-limit frequency of the second frequency range is 85.5 MHz, and the upper-limit frequency of the third frequency range is 108.0 MHz. By also using a third divisor, a synthesizer signal with a frequency range of 76-108 MHz can be generated by dividing down the narrow first frequency range whose frequency limits vary from the midpoint of the range by less than ±7%. The frequency range of 76-108 MHz covers both the FM band used in Japan (76 MHz to 90 MHz) and the FM band used in the United States, Canada and Europe (87.5 MHz to 108.0 MHz).

In one embodiment, the narrow first frequency range is from 2736 to 3126.86 MHz and does not overlap any of the RF spectrum of the most widely used existing communication functions, such as the frequencies allocated under the various standards for GSM, CDMA, WCDMA, WiFi, Bluetooth and GPS. A VCO signal that varies over the narrow first frequency range can be generated with a VCO that is calibrated by switching fewer capacitors. Less parasitic capacitance results from the fewer switches used to change the capacitance in order to calibrate the VCO over the narrower first frequency range. In another embodiment, an even narrower higher frequency range is divided down by using five divisors to generate the FM radio frequency range of 76-108 MHz. The frequency limits of the even narrower frequency range vary from the midpoint of the range by about ±3.5%.

A mobile communication device includes both a radio frequency (RF) receiver and a frequency modulation (FM) receiver. Thus, the mobile communication device can receive signals from both base stations of cellular networks as well as from FM radio stations. The FM receiver includes a VCO and a programmable output divider. The VCO is part of a phase-locked loop. The VCO of the FM receiver can generate a VCO signal at the same time that the VCO of the RF receiver is generating a second VCO signal without the two VCO signals interfering with one another. The VCO of the RF receiver has a first inductor, and the VCO of the FM receiver has a second inductor. In one embodiment wherein the RF receiver and the FM receiver are both in a cell phone, the first inductor is located within five centimeters of the second inductor. In one aspect, the RF receiver and the FM receiver are integrated onto a single integrated circuit.

The VCO of the FM receiver generates the VCO signal over a VCO frequency range. The programmable output divider receives the higher frequency VCO signal and divides the VCO frequency by a first divisor to output a lower-frequency synthesizer signal whose frequency varies over a first synthesizer range. The programmable output divider also divides the VCO frequency by a second divisor to output the synthesizer signal over a second frequency range. The combined first and second synthesizer ranges have a wider frequency range than does the VCO frequency range. The upper-limit frequency and the lower-limit frequency of the VCO frequency range vary from the midpoint frequency by less than plus or minus seven percent, respectively.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

DETAILED DESCRIPTION

As additional communication functions are added to mobile communication devices, the frequency synthesizers used for the various functions begin to interfere with one another. A typical frequency synthesizer used in radio frequency (RF) processing of voice and data communications includes a voltage-controlled oscillator (VCO) with an inductor-capacitor (LC) tank. As additional communication functionality is added to a mobile communication device, the signals generated by the added frequency synthesizers can interfere with the inductors of the VCOs already present on the mobile communication device. One way to avoid such interference is to physically separate the inductors so that they are not magnetically coupled. Where all of the communication functions are on the same mobile communication device, however, the inductors cannot be separated by large distances. For example, where the mobile communication device is a cell phone, the inductors cannot be separated by more than about five centimeters. In addition, it may be desirable for cost and design reasons to include the transceivers for the various communication functions on the same integrated circuit, in which case the inductors cannot be separated by more than a few millimeters.

Another way to avoid interference with inductors on different frequency synthesizers is to reduce the size of the inductor in the added LC oscillator. A design with a smaller inductor size can be achieved by using a configurable capacitor with a larger capacitance that can achieve a larger tuning range. Smaller inductor sizes, however, tend to result in higher loading conductance and lower loading resistance. But in order to produce the oscillator startup gain, there must be a low conductance from the cross-coupled differential pairs of capacitors. Achieving the low conductance consumes a higher amount of power. Thus, the large amount of power consumed by a frequency synthesizer with a very small inductor in its LC oscillator is usually inappropriate for use in a battery-powered mobile communication device.

Yet another way to avoid interference with inductors on different frequency synthesizers is to ensure that each additional communication function transmits and receives at frequencies other than those generated by the existing frequency synthesizers. The RF spectrum used by existing communication functions, however, is already relatively crowded. The frequencies of some existing communications standards that should be avoided by added synthesizers include, but are not limited to: frequencies between 421 and 493 MHz for the CDMA 450 standard, frequencies between 869 and 894 MHz for the GSM/CDMA 850 standards, frequencies between 925 and 980 MHz for the GSM 900 standard, 1575 MHz for the global positioning system (GPS) standard, frequencies between 1805 and 1880 MHz for the GSM 1800 standard, frequencies between 1930 and 1990 MHz for the GSM/CDMA/WCDMA 1900 standards, frequencies between 2110 and 2170 MHz for the WCDMA 2100 standard, frequencies between 2412 and 2484 MHz for the WiFi 802.11b/g standards, frequencies between 2620 and 2690 MHz for the Bluetooth BT65 standard, frequencies between 2500 and 2700 as well as between 3300 and 3400 MHz for WiMAX broadband wireless access (BWA) standards, and frequencies between 4915 and 5825 MHz for the WiFi 802.11a/h/j standards.

Even frequency synthesizers that do not generate frequencies within already occupied spectrum bands can nevertheless interfere with existing frequency synthesizers if the added frequency synthesizer generates a frequency that is a harmonic of one of the frequencies generated by an existing synthesizer. For example, frequency synthesizers used by additional communication functions should also not generate signals with frequencies at the 3150-MHz harmonic of the GPS positioning signal (double the 1575 MHz of the main signal).

Limiting interference by avoiding frequencies already used by existing communication functions is particularly difficult where the added function uses a broad range of frequencies. For example, receiving frequency modulation (FM) radio signals is one communication function that requires a frequency synthesizer to generate signals over a broad range of frequencies in order to process the radio signals received over the entire FM frequency band. For a mobile communication device that is to be sold in a worldwide market, it is desirable to receive radio signals not only in the FM band used in the United States, Canada and Europe (87.5 MHz to 108.0 MHz), but also in the FM band used in Japan (76 MHz to 90 MHz). Thus, the overall frequency range of radio signals to be processed is from 76.0 MHz to 108.0 MHz.

It would be undesirable to use a frequency synthesizer with a VCO that oscillates over the relatively low frequencies between 76 and 108 MHz. Such a VCO would be large and could not be integrated onto a single integrated circuit with the FM transceiver. The frequency generated by an LC oscillator is inversely related to the product of the inductance times the capacitance. Thus, a low frequency is achieved by using a large inductor. Implementing an on-chip LC oscillator that generates a frequency below 1 GHz is generally not practical because the area required for the inductor is too large. Thus, frequency synthesizers for communication functions are typically designed to generate higher frequency signals whose frequencies are then divided down.

But generating higher frequency signals whose frequencies are divided down is problematic when designing a frequency synthesizer for an FM radio receiver that receives radio signals over a range from 76.0 MHz to 108.0 MHz. The absolute range of the higher frequency signals increases proportionately to the divisor used to divide the higher frequency signals. Thus, the range of the higher frequency signals is likely to overlap the frequency range of at least one of the existing communications functions that are to be avoided. For example, where a divisor of ten is used, the higher frequency signals would range from 760 to 1080 MHz. These higher frequency signals would interfere with the inductor of the VCO that generates clock signals between 925 and 980 MHz for the GSM 900 standard. By comparing the range of higher frequency signals corresponding to various divisors with the non-exhaustive list of frequency ranges above used by existing communication functions, it is apparent that there are very few pieces of spectrum that could accommodate the range of higher frequency signals that could be divided down to the 76-108 MHz range by nearly all possible integer divisors.

Figure 1:
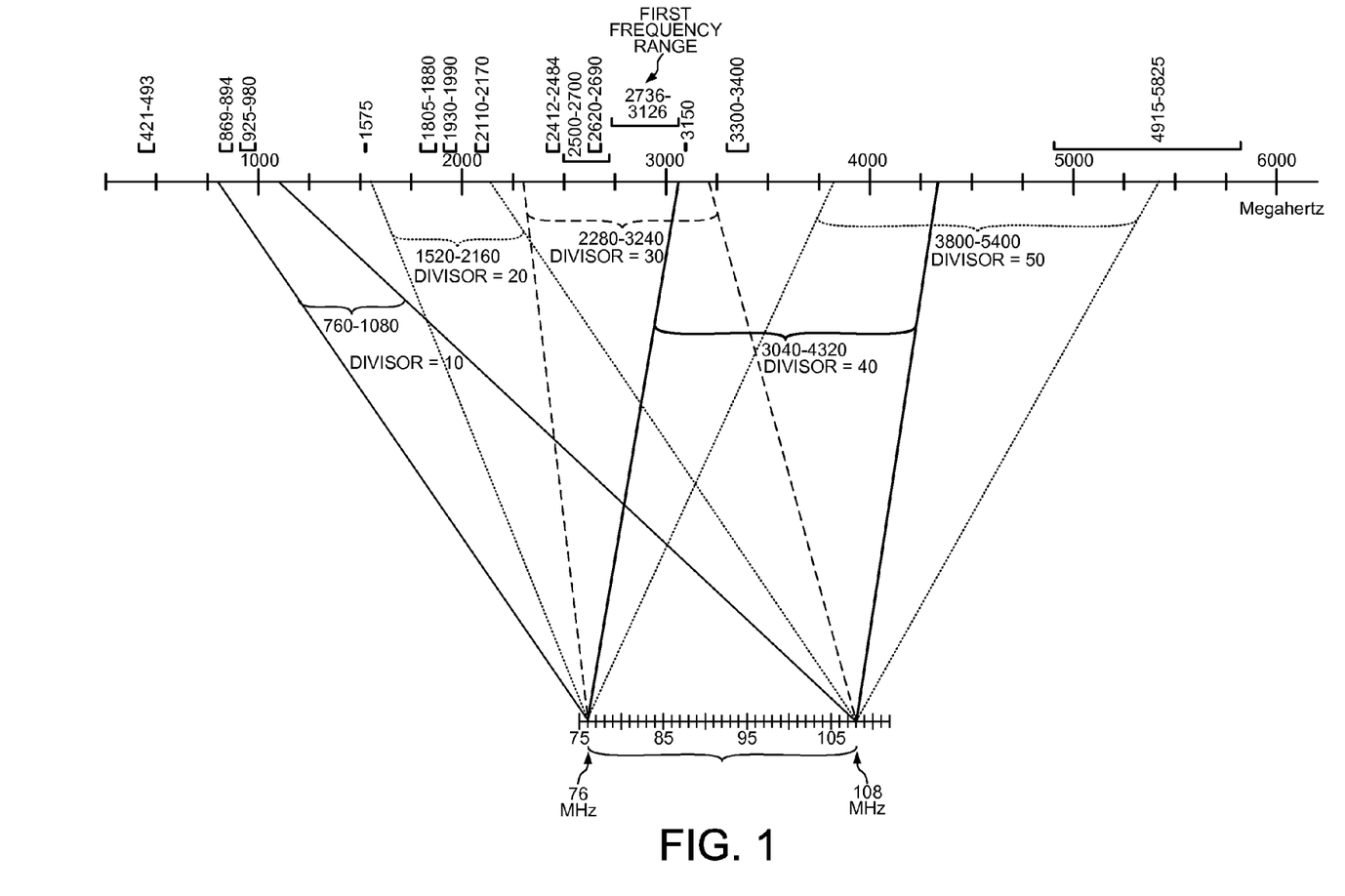
FIG. 1 is a diagram illustrating ranges of higher frequency signals that can be divided down using various divisors to generate the FM radio band from 76-108 MHz.

FIG. 1 shows five ranges of higher frequency signals that would be divided down to the 76-108 MHz range by using the divisors 10, 20, 30, 40 and 50. It is apparent from FIG. 1 that none of these five higher frequency ranges avoids all of the spectrum used by the listed existing communication functions. The ranges used by the existing communication functions listed above (421-493, 869-984, 925-980, 1575, 1805-1889, 1930-1990, 2110-2170, 2412-2484, 2620-2690, 2500-2700, 3150, 3300-3400, and 4915-5825 megahertz) can be avoided only if one of the following seven divisors is used: 2, 3, 7, 8, 13, 14 and 45. Using the divisors 2, 3, 7, 8 and 13 is not practical, however, because the higher frequency signals would have frequencies lower than 1 GHz and could not be generated by an on-chip LC oscillator. Only the limited option of generating higher frequency signals in the range 1064-1512 MHz and dividing down by 14 or generating higher frequency signals in the range 3420-4860 MHz and dividing down by 45 remain feasible. In addition, harmonics of the frequencies between 2412 and 2484 MHz for the WiFi 802.11b/g standards overlap the range 3420-4860 MHz. Twice the frequency of the 2412-MHz lower limit of the WiFi frequency range (i.e., 4824 MHz) falls within the range 3420-4860 MHz that corresponds to using the divisor 45. Finally, an LC oscillator that generates the 1.064-GHz signal of the lower limit of the frequency range corresponding to using the divisor 14 might be undesirably large from a cost perspective, even though it is technically feasible.

Therefore, a frequency synthesizer with an on-chip LC oscillator that divides down higher frequency signals to the FM radio band from 76-108 MHz is desired that nevertheless does not generate higher frequency signals that overlap with spectrum used by existing communication functions performed on the mobile communication device. The solution is to use multiple divisors to divide down a smaller range of higher frequency signals so as to generate the entire range of frequencies from 76-108 MHz. The smaller range of higher frequency signals can then be chosen to fit within any of multiple places between the frequency ranges used by the existing communication functions listed above. In one embodiment, a frequency synthesizer divides a smaller range of higher frequency signals into three subranges of the frequencies 76-108 MHz by using three divisors.

Figure 2:
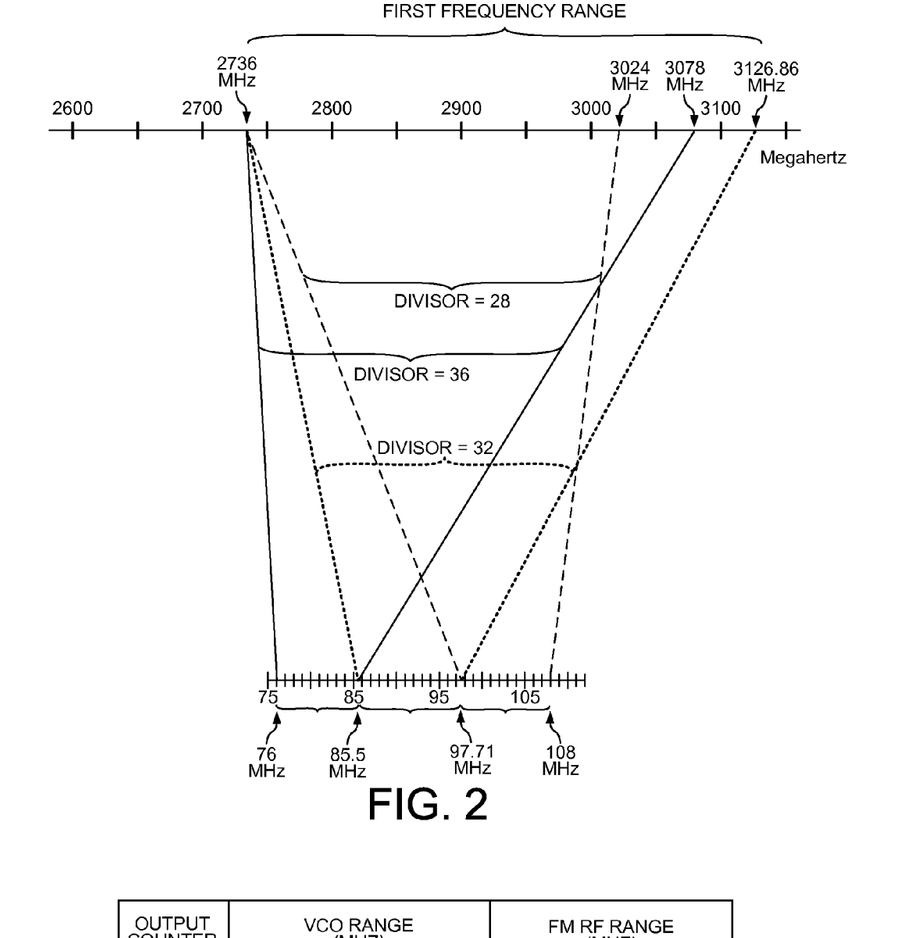
FIG. 2 is a diagram illustrating a narrower higher frequency range that can be alternately divided down with multiple divisors to generate the entire 76-108 MHz range.

FIG. 2 illustrates a narrower higher frequency range that can be used to generate the entire FM radio band from 76-108 MHz by alternately dividing down with multiple divisors. A first frequency range from 2736 to 3126.86 MHz can be divided alternately with the three divisors thirty-six, thirty-two and twenty-eight to generate the three subranges 76-85.5 MHz, 85.5-97.71 MHz and 97.71-108 MHz that together make up the FM radio band from 76-108 MHz.

Figure 3:
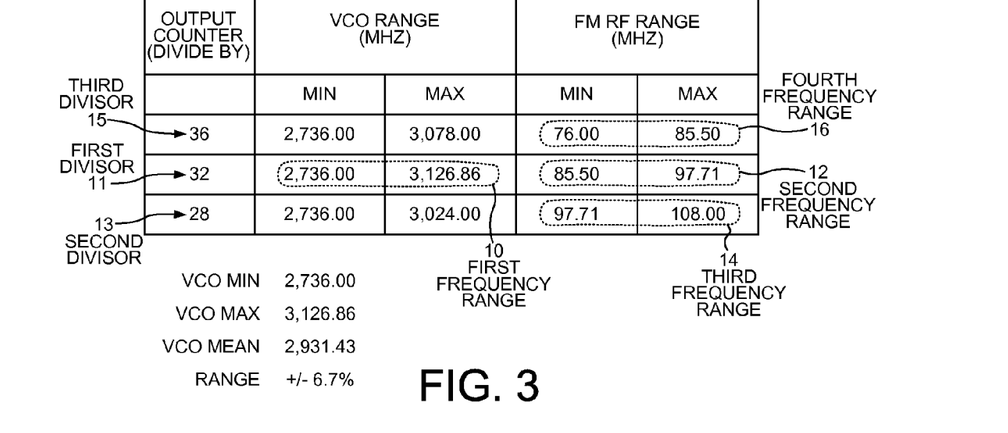
FIG. 3 is a table listing three subranges of the 76-108 MHz range that can be generated from higher frequency signals in the smaller range from 2.736-3.126 GHz.

FIG. 3 is a table that lists the three subranges of the FM radio band from 76-108 MHz that can be generated using an LC oscillator that generates higher frequency signals in the smaller range from 2.736-3.126 GHz. This first frequency range 10 from 2.736-3.126 GHz does not overlap any of the frequency ranges used by existing communication functions listed above. The frequencies in first frequency range 10 vary by only 6.7% from the midpoint of the range (2.931 GHz). If the higher frequency signals were not divided, then the LC oscillator would have to generate signals that vary by 17.4% from the midpoint of the range in order to cover the entire FM tuning range from 76-108 MHz. Varying the frequency of the LC oscillator over the smaller frequency variation of ±6.7% requires switching fewer capacitors than would be needed if subranges were not employed and the frequency would be varied by the same step size over a frequency variation of ±17.4%. By using fewer capacitors in the LC oscillator, fewer switches are required to switch the capacitors. By using fewer switches, less parasitic capacitance is generated which would otherwise limit the range of the LC oscillator.

By dividing the higher frequencies in first frequency range 10 by a first divisor thirty-two (11), synthesizer frequencies in a second range 12 from 85.50 to 97.71 MHz are generated. The higher frequencies in a portion of first frequency range 10 are divided by a second divisor twenty-eight (13) to generate synthesizer frequencies in a third range 14 from 97.71 to 108.0 MHz. Finally, the higher frequencies in another portion of first frequency range 10 are divided by a third divisor twenty-eight (15) to generate synthesizer frequencies in a fourth range 16 from 76.0 to 85.5 MHz. The upper limit of second frequency range 12 falls at the lower limit of third frequency range 14, and the lower limit of second frequency range 12 falls at the upper limit of fourth frequency range 16. Thus, the three frequency subranges 12, 14 and 16 cover the entire FM radio band from 76-108 MHz.

Figure 4:
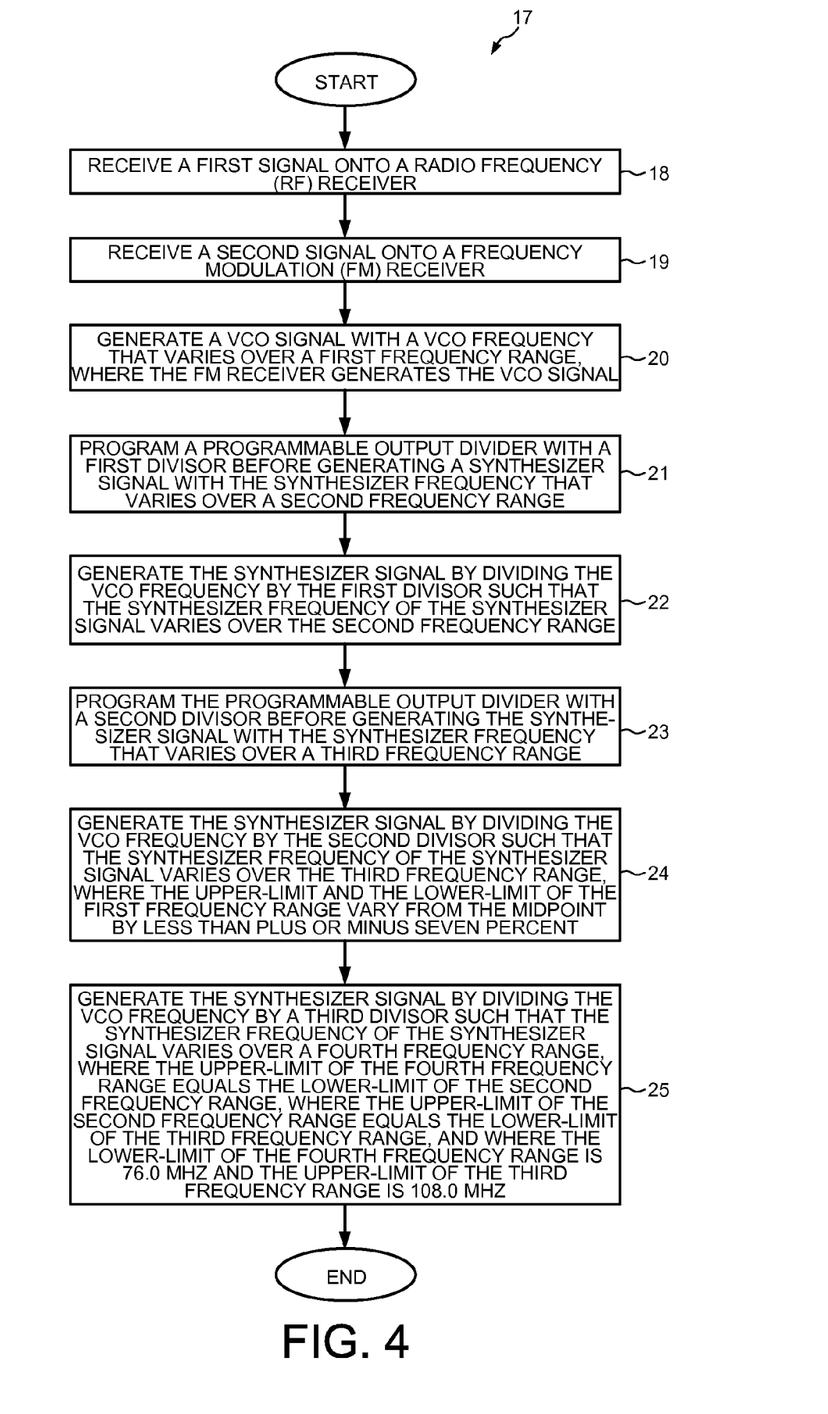
FIG. 4 shows is a flowchart of a method for dividing down higher frequency signals generated by an on-chip LC oscillator in a mobile communication device to obtain signals in the 76-108 MHz range without generating higher frequency signals that overlap frequencies used by existing communication functions.
Figure 5:
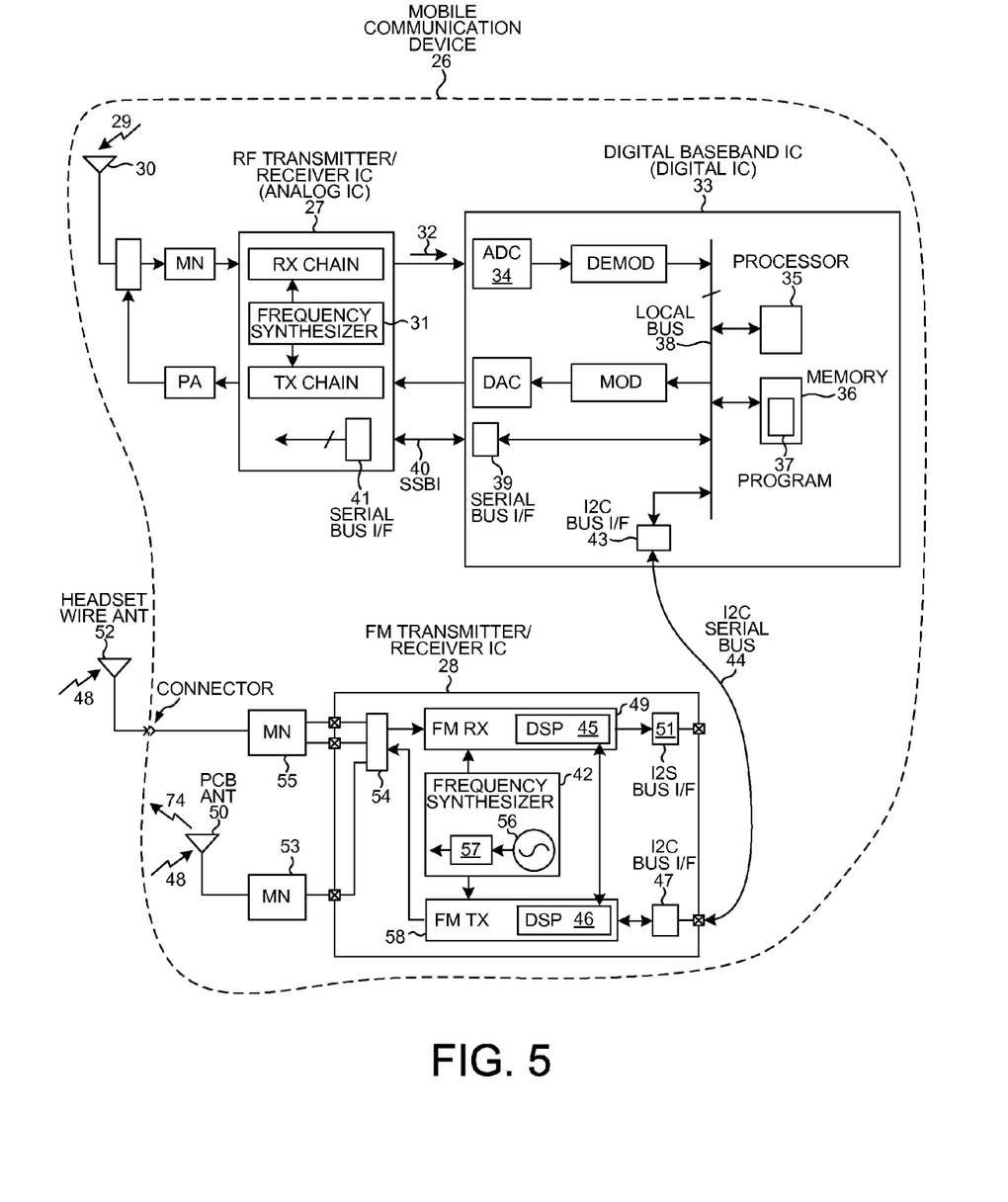
FIG. 5 is a simplified high level block diagram of a mobile communication device with an RF transceiver integrated circuit (IC) and an FM transceiver IC that practice the method of FIG. 4.

FIG. 4 shows is a flowchart of a method 17 for dividing down higher frequency signals generated by an on-chip LC oscillator in a mobile communication device to obtain signals in the FM radio band from 76-108 MHz without generating higher frequency signals that overlap frequencies used by existing communication functions performed on the mobile communication device. The steps 18-25 of method 17 are now described as performed by software executing on a processor in a mobile communication device shown in FIG. 5. FIG. 5 shows a mobile communication device 26 with an RF transceiver integrated circuit (IC) 27 and an FM transceiver IC 28. Each of transceivers 27 and 28 is called a "transceiver" because it includes a transmitter as well as a receiver.

In a first step 18, a first signal 29 is received onto an RF receiver on mobile communication device 26. In this particular example, mobile communication device 26 is a cellular telephone. In another example, mobile communication device 26 is an RF-enabled personal digital assistant (PDA). In this embodiment, first signal 29 is a radio frequency signal transmitted by a base station. First signal 29 is received onto antenna 30, passes through a matching network (MN) and is processed by the receive chain of RF transceiver IC 27. The receive chain uses a VCO signal generated by a frequency synthesizer 31 to downconvert first signal 29 to a baseband signal 32 for subsequent digital signal processing by a digital baseband IC 33.

RF transceiver IC 27 is an analog IC, whereas digital baseband IC 33 is a digital IC. Thus, downconverted baseband signal 32 is digitized by analog-to-digital converter 34 as baseband signal 32 is received onto digital baseband IC 33. Digital baseband IC 33 includes, among other parts not illustrated, a digital processor 35 that executes instructions stored in a processor-readable medium 36. For example, processor-readable medium 36 includes program memory that stores instructions of a computer program 37 that, when executed, performs steps 18-25 of method 17. In one embodiment, all of the steps of method 17 are performed by instructions executing on processor 35. In another embodiment, some of the steps of method 17 are performed by instructions executing on processor 35, and other steps of method 17 are performed by instructions executing on processors located in FM transceiver IC 28. For example, processor 35 executes instructions that tune the FM receiver to a radio station specified by the user, whereas the processors in the FM transceiver execute instructions that compute the divisors for a frequency synthesizer in the FM transceiver.

Processor 35 causes information to be communicated across a parallel local bus 38, a serial bus interface 39 and a serial bus conductors (SSBI) 40 to a serial bus interface 41 of RF transceiver IC 27. Thus, processor 35 controls the operation of frequency synthesizer 31. In one embodiment, processor 35 controls the operation of a frequency synthesizer 42 on FM transceiver IC 28. Processor 35 causes information to be communicated across parallel local bus 38, an Inter IC (I2C) bus interface 43 and an I2C serial bus 44 to an I2C bus interface 47 of FM transceiver IC 28. In another embodiment, a second processor 45 and a third processor 46 located in FM transceiver IC 28 control some of the operations of frequency synthesizer 42. The term "computer" encompasses processor 35 that executes "code" (computer program 37) of instructions stored in memory 36 (a computer-readable medium). The term "computer" also encompasses the second and third processors 45-46 located in FM transceiver IC 28.

In a step 19, a second signal 48 is received onto an FM receiver 49 on mobile communication device 26. Second signal 48 is a radio frequency signal transmitted by a radio station in the FM radio band from 76-108 MHz. Where mobile communication device 26 is used in the United States, Canada or Europe, the frequency of second signal 48 falls within a frequency range from 87.5 MHz to 108.0 MHz. Where mobile communication device 26 is used in Japan, the frequency of second signal 48 falls within a frequency range from 76 MHz to 90 MHz.

In one implementation, second signal 48 is received onto an antenna 50 that is printed on the printed circuit board (PCB) onto which FM transceiver IC 28 is mounted. The size of the printed circuit board is limited within mobile communication device 26, and therefore the length of antenna 50 is also limited. Where better FM radio reception is desired by using a longer antenna, the user of mobile communication device 26 may use a longer headset wire antenna 52 that is integrated into the wire that connects the headset or earplug to mobile communication device 26. Where second signal 48 is received onto PCB antenna 50, second signal 48 passes through a matching network (MN) 53 and is received by a front-end matching block 54. Where second signal 48 is received onto wire antenna 52, second signal 48 passes through a matching network 55 and is received by front-end match block 54. After being received onto front-end matching block 54, second signal 48 is processed by FM receiver 49. In order to process second signal 48, FM receiver 49 uses a VCO signal generated by a VCO 56 and a programmable output divider 57 of frequency synthesizer 42. The processed and digitized audio signals are then communicated from FM receiver 49 via an Inter-IC Sound (I2S) bus interface 51 to digital baseband IC 33, where they are further processed before being transmitted to a speaker on mobile communication device 26 or to the headset or earplug. In another embodiment, some of the digital processing of the digitized audio signals is performed on processors 45-46 located on FM transceiver IC 28. FM transceiver IC 28 also has an FM transmitter 58 that can transmit audio signals received via I2C serial bus 44 from digital baseband IC 33.

In a step 20, FM receiver 49 generates a VCO signal 59 with a VCO frequency that varies over first frequency range 10.

Figure 6:
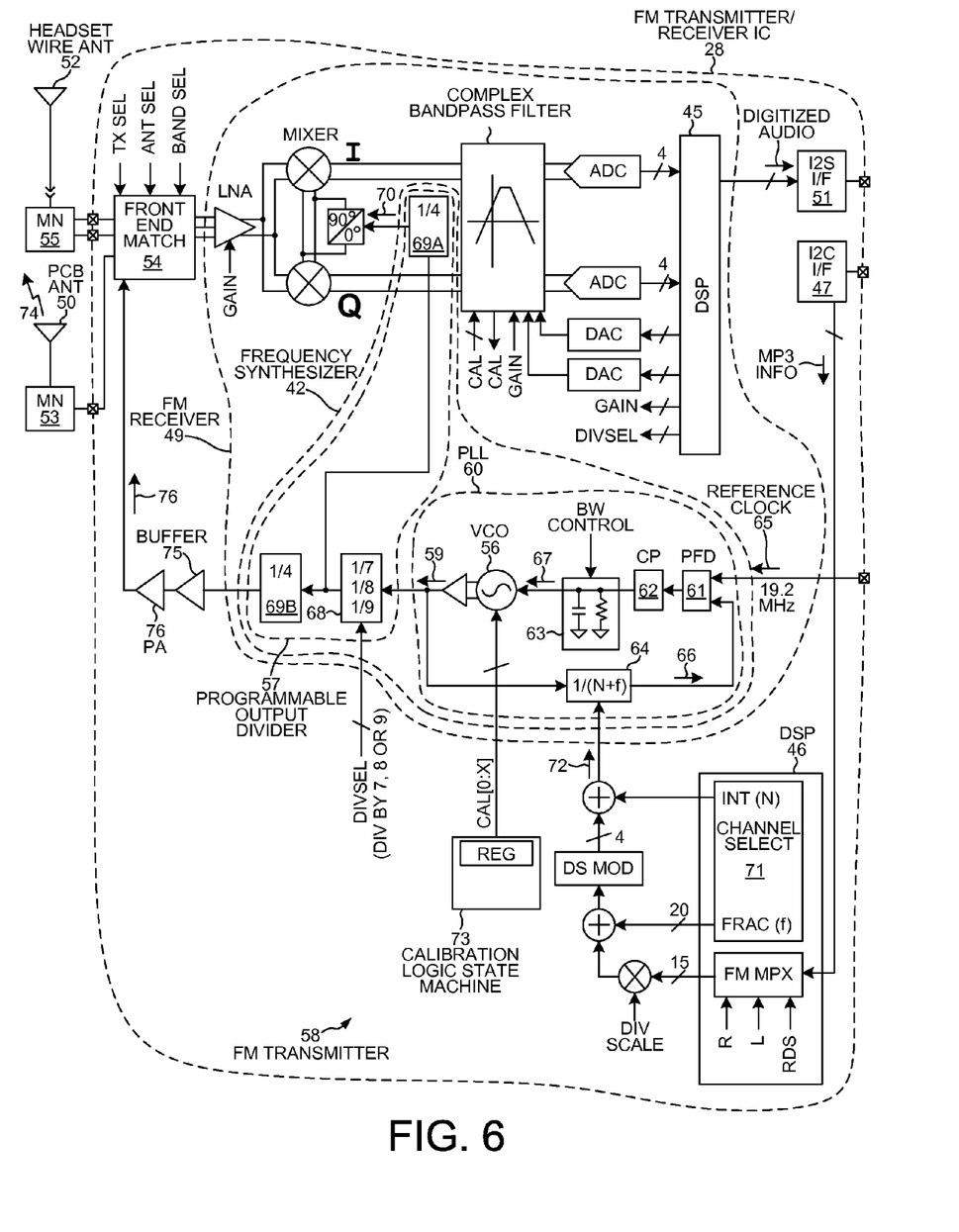
FIG. 6 is a simplified block diagram showing the FM transceiver IC of FIG. 5 in more detail, including a VCO within the FM transceiver IC.

FIG. 6 shows FM transceiver IC 28 in more detail and shows how FM receiver 49 generates VCO signal 59. VCO signal 59 is generated by VCO 56 that is part of a phase-locked loop (PLL) 60. PLL 60 includes a phase frequency detector (PFD) 61, a charge pump 62, a loop filter 63, VCO 56 and a frequency divider 64. Phase frequency detector 61 compares the phase of a reference clock signal 65 to the phase of a feedback signal 66 and generates phase-error signals. In one embodiment, reference clock signal has a frequency of 19.2 MHz. Feedback signal 66 is a "divide-by-N" signal output by frequency divider 64. Frequency divider 64 divides the frequency of VCO signal 59. When the phase of feedback signal 66 lags behind that of reference clock signal 65, phase frequency detector 61 sends an accelerate control signal to charge pump 62. When the phase of feedback signal 66 leads that of reference clock signal 65, phase frequency detector 61 sends a decelerate control signal to charge pump 62. Charge pump 62 drains charge from its output lead upon receiving an accelerate control signal and adds charge to its output lead upon receiving a decelerate control signal. An input port VCO 56 is coupled to an output lead of charge pump 62, and the charge drained and added by charge pump 62 constitutes a control voltage 67 received by VCO 56. Loop filter 63 is also coupled to the node that couples the input port of VCO 56 and the output lead of charge pump 62. In one embodiment, loop filter 63 is adjusted for bandwidth control. As control voltage 67 increases, the frequency of VCO signal 59 output by VCO 56 decreases.

In a step 21, programmable output divider 57 is programmed with first divisor 11. In one implementation, first divisor 11 is the integer thirty-two and is applied in two steps. First, processor 35 programs programmable output divider 57 by transmitting a multi-bit divisor select (DIVSEL) signal to a first divider portion 68 of output divider 57. In this implementation, first divider portion 68 is programmed to divide the frequency of VCO signal 59 by eight. Then a second divider portion 69 divides the output signal of first divider portion 68 by the additional integer divisor four. Second divider portion has two parts: a first part 69A that is used for the receive path and a second part 69B that is used for the transmit path. First part 69A is placed physically close to the mixer of the receive path in order to maintain the correct I/Q relationship of the received signals. (To guarantee good FM reception quality when a jammer is present, the reciprocal mixing effect imposes a stringent requirement for the oscillator phase noise between a 200 KHz and 500 KHz offset (−112 dBc/Hz @200 KHz and −126 dBc/Hz @500 KHz)). Thus, programmable output divider 57 divides the frequency of VCO signal 59 by a total of thirty-two. Where the value of the divisor applied by programmable output divider 57 is designated to be "M", the frequency of the signal output by frequency synthesizer 42 can be expressed as $F_{OUT}=F_{REF}*(N+f)/M$. Thus, in this embodiment where reference clock signal 65 has a frequency of 19.2 MHz, the output frequency in megahertz of frequency synthesizer 42 is $F_{OUT}=19.2*(N+f)/M$.

In a step 22, frequency synthesizer 42 outputs a synthesizer signal 70 that is VCO signal 59 divided by first divisor 11. Synthesizer signal 70 has a synthesizer frequency that varies over the second frequency range 12 from 85.50 to 97.71 MHz. For example, the lower-limit frequency 2,736 MHz of first frequency range 10 divided by thirty-two (first divisor 11) is 85.50 MHz, the lower-limit frequency of second frequency range 12. Similarly, the upper-limit frequency 3,126.86 MHz of first frequency range 10 divided by thirty-two (first divisor 11) is 97.71 MHz, the upper-limit frequency of second frequency range 12. When the user of mobile communication device 26 desires to listen to a radio station transmitted on a frequency that falls within second frequency range 12, VCO signal 59 is set at the one frequency that when divided down by thirty-two equals the frequency of the desired FM radio station. For example, if the user desires to listen to the Bay Area FM radio station KOIT transmitted at 96.5 MHz, VCO signal 59 is set to 3,088 MHz. VCO signal 59 is set to a desired higher frequency by setting the divisor (N+f) of frequency divider 64. Processor 35 sets the divisor (N+f) by controlling a channel select block 71 within third processor 46 of FM transceiver IC 28. Channel select block 71 outputs an integer output and a fraction output that are combined into a divisor setting signal 72 that sets the appropriate (N+f) value.

Figure 7:
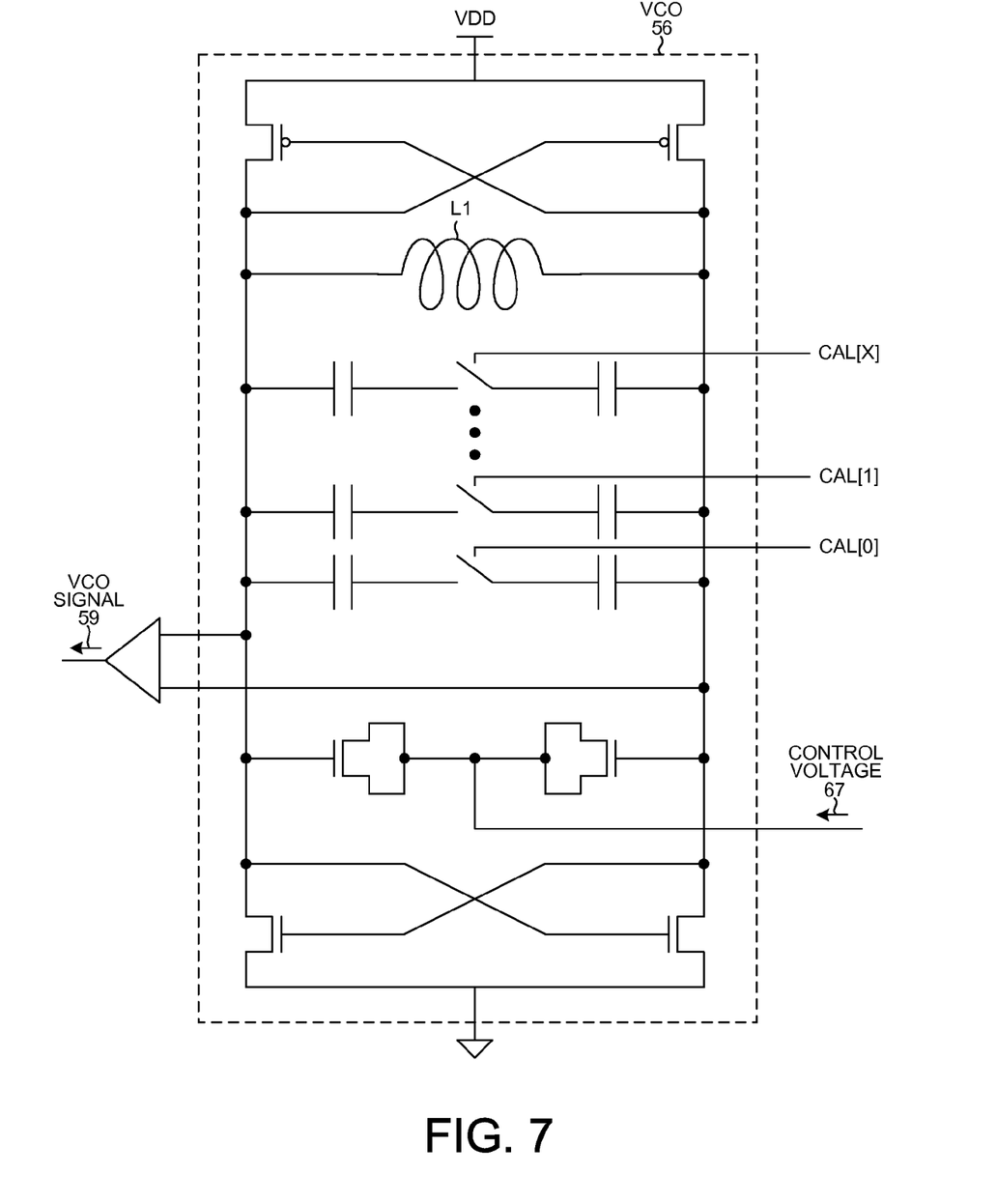
FIG. 7 is a block diagram showing the VCO of the FM transceiver IC of FIG. 6 in more detail.

FIG. 7 shows VCO 56 in more detail. By adjusting the (N+f) value received by frequency divider 64, feedback signal 66 and ultimately control voltage 67 are adjusted, which changes the frequency generated by the LC tank of VCO 56. In addition, a calibration logic state machine 73 with a register is used to calibrate the frequency generated by VCO 56 so that PLL 60 generates a VCO signal 59 with a predetermined frequency for a specific (N+f) value. In one implementation, VCO 56 has about one hundred capacitor pairs connected in parallel with inductor L1. A calibration signal CAL[X] either connects or disconnects each successive capacitor pair from the LC oscillator. By reducing the range of higher frequencies that VCO 56 must generate to cover the entire FM radio bandwidth, fewer capacitor pairs need be used to make an LC tank that will oscillate over that reduced frequency range.

In a step 23, programmable output divider 57 is programmed with second divisor 13. In one implementation, second divisor 13 is the integer twenty-eight and is applied in two steps. First, processor 35 programs programmable output divider 57 by transmitting the divisor select signal to first divider portion 68 of output divider 57 in order to program first divider portion 68 to divide the frequency of VCO signal 59 by seven. Then second divider portion 69 divides the output signal of first divider portion 68 by the additional integer divisor four. Thus, programmable output divider 57 divides the frequency of VCO signal 59 by a total of twenty-eight.

In a step 24, frequency synthesizer 42 outputs synthesizer signal 70 that is VCO signal 59 divided by second divisor 13. Synthesizer signal 70 has a synthesizer frequency that varies over the third frequency range 14 from 97.71 to 108.0 MHz. For example, the lower-limit frequency 2,736 MHz of first frequency range 10 divided by twenty-eight (second divisor 13) is 97.71 MHz, the lower-limit frequency of third frequency range 14. In step 24, the frequency of VCO signal 59 need not vary over the entire first frequency range 10 in order to generate synthesizer signal 70 over the entire third frequency range. When VCO signal 59 reaches an upper frequency of 3,024 MHz and is divided by twenty-eight (second divisor 13), synthesizer signal 70 is generated with a frequency of 108 MHz, the upper-limit frequency of second frequency range 12. Thus, a different divisor (N+f) value is used to generate the frequency of VCO signal 59 that results in the upper-limit frequency of third frequency range 14 than is used to generate the frequency of VCO signal 59 that results in the upper-limit frequency of second frequency range 12.

In a step 25, programmable output divider 57 is programmed with third divisor 15, and synthesizer signal 70 is generated by dividing the frequency of VCO signal 59 by third divisor 15 such that the frequency of synthesizer signal 70 varies over fourth frequency range 16. As in step 24, the frequency of VCO signal 59 need not vary over the entire first frequency range 10 in order to generate synthesizer signal 70 over the entire fourth frequency 16. When VCO signal 59 reaches an upper frequency of 3,078 MHz and is divided by thirty-six (third divisor 15), synthesizer signal 70 is generated with a frequency of 85.5 MHz, the upper-limit frequency of fourth frequency range 16. The upper limit of fourth frequency range 16 generated in step 25 equals the lower-limit of second frequency range 12 generated in step 22. The upper limit of second frequency range 12 generated in step 22 equals the lower limit of third frequency range 14 generated in step 24. Finally, the lower limit of fourth frequency range 16 and the upper-limit of third frequency range 14 correspond to the upper and lower limits of the extended international FM radio band from 76-108 MHz.

In another embodiment, FM transceiver IC 28 is also used to transmit FM radio signals. Whereas in a receive mode, the divisor (N+f) of frequency divider 64 is fixed to correspond to the FM radio station from which radio signals are being received, in the transmit mode the (N+f) value is modulated in order to generate a frequency-modulated FM radio signal 74 that is transmitted. For example, the user may wish to play songs on a car radio that are stored in MP3 format on mobile communication device 26. To play MP3 recording, MP3 information is communicated from digital baseband IC 33 via I2C serial bus 44 to RM transceiver IC 28. Digital computation block 38 receives the MP3 information, processes it and generates divisor setting signal 72 with modulated (N+f) values. VCO 56 then outputs VCO signal 59 that is modulated around a higher frequency within first frequency range 10 that is chosen according to design preference. Frequency synthesizer 42 then outputs synthesizer signal 70 that has been divided down into a chosen frequency within the second, third or fourth frequency range, depending on which divisor is chosen. For example, if no radio station transmits at 95.5 MHz in the area in which the user is driving, then the user can set the mobile communication device 26 to transmit a radio signal at 95.5 MHz to the car radio that plays the songs that are recorded in MP3 format on mobile communication device 26. The radio signal at 95.5 MHz is generated from a VCO signal 59 with modulation around the frequency 3056 MHz that is divided by thirty-two, (first divisor 11). Synthesizer signal 70 at 95.5 MHz containing modulated MP3 information passes through a buffer 75 and a power amplifier 76 and is communicated as a radio transmission 77 at 95.5 MHz to PCB antenna 50. Radio transmission 77 is transmitted from antenna 50 as FM radio signal 74 a short distance to the FM receiver of the car radio, and the MP3 songs play on the car radio channel at 95.5 MHz.

As the MP3 songs are playing on the car radio, mobile communication device 26 is also receiving pilot signals as it is being handed off from one base station to another. Thus, the RF receiver of RF transceiver IC 27 is receiving pilot signals at the same time as FM transmitter 58 is transmitting FM radio signal 74. And consequently, VCO 56 of frequency synthesizer 42 is generating VCO signal 59 as the same time as the VCO of the RF receiver is generating a VCO signal. Each VCO signal would interference with the inductor of the other VCO if first frequency range 10 where not chosen so as to avoid the frequency ranges used by existing communication functions, such as the various wireless communication standards, WiFi standards and GPS standards. Moreover, first frequency range 10 can be chosen so as to avoid the frequencies used by existing communication functions only because it has been narrowed by applying multiple divisors. Where an even narrower high frequency range is desired, more divisors can be used. For example, a high frequency range that varies by only ±3.5% from the midpoint of the range can be implemented by using the five divisors 28, 30, 32, 34, and 36. The implementation with five divisors, however, would also require the additional division by 7.5 and 8.5 in first divider portion 68 in order to generate the in-phase (I) and quadrature (Q) phases for the mixer of FM receiver 49.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. RF transceiver IC 27 and FM transceiver IC 28 are described above as being separate integrated circuits. In another embodiment, however, RF transceiver IC 27 and FM transceiver IC 28 are integrated onto the same integrated circuit. Thus, the same integrated circuit includes two inductors: one in the VCO of the RF transceiver and second in the VCO of the FM transceiver. In yet another embodiment, both the analog and the digital functions of mobile communication device 26 are performed on a single integrated circuit, called a system on a chip (SOC). In the SOC implementation, RF transceiver IC 27, FM transceiver IC 28 and digital baseband IC 33 are all integrated onto the same integrated circuit. Accordingly, various modifications, adaptations, and combinations of the various features of the described specific embodiments can be practiced without departing from the scope of the claims that are set forth below.

What is claimed is:

1. A method comprising:
   generating a voltage-controlled oscillator (VCO) signal having a VCO frequency that varies over a first frequency range, wherein the VCO signal is generated by a frequency modulation (FM) receiver; and
   generating a synthesizer signal by dividing the VCO frequency by a divisor value selected from a set of divisor values, wherein each of a first divisor value and a second divisor value of the set of divisor values is an integer multiple of four,
   wherein, when the divisor value is the first divisor value, a synthesizer frequency of the synthesizer signal varies over a second frequency range;
   wherein, when the divisor value is the second divisor value, the synthesizer frequency of the synthesizer signal varies over a third frequency range; and
   wherein the second frequency range and the third frequency range are substantially contiguous.

2. The method of claim 1,
   wherein an upper-limit frequency of the second frequency range is approximately equal to a lower-limit frequency of the third frequency range, and
   wherein a lower-limit frequency of the second frequency range is approximately 85.5 MHz and an upper-limit frequency of the third frequency range is approximately 108.0 MHz.

3. The method of claim 1,
   wherein the set of divisor values includes a third divisor value;
   wherein, when the divisor value is the third divisor value, the synthesizer frequency of the synthesizer signal varies over a fourth frequency range having an upper-limit frequency and a lower-limit frequency;
   wherein the upper-limit frequency of the fourth frequency range is approximately equal to a lower-limit frequency of the second frequency range, and
   wherein the lower-limit frequency of the fourth frequency range is approximately 76.0 MHz and an upper-limit frequency of the third frequency range is approximately 108.0 MHz.

4. The method of claim 1, further comprising programming a programmable output divider with the first divisor value before generating the synthesizer signal with the synthesizer frequency that varies over the second frequency range.

5. The method of claim 1, wherein generating the VCO signal having the VCO frequency that varies over the first frequency range involves successively switching on and off one or more capacitors that are connected in parallel with an inductor.

6. The method of claim 1, further comprising:
   receiving a first signal via a radio frequency (RF) receiver;
   receiving a second signal via the FM receiver; and
   wherein the second signal is received via the FM receiver while the RF receiver is receiving the first signal.

7. The method of claim 1,
   wherein a radio frequency (RF) receiver generates a second VCO signal with a frequency that does not fall within the first frequency range, and
   wherein the RF receiver receives:
      a CDMA 450 signal with a frequency between 421 and 493 MHz,
      a GSM/CDMA 850 signal with a frequency between 869 and 894 MHz,
      a GSM 900 signal with a frequency between 925 and 980 MHz,
      a GSM 1800 signal with a frequency between 1805 and 1880 MHz,
      a GSM/CDMA/WCDMA 1900 signal with a frequency between 1930 and 1990 MHz,
      a WCDMA 2100 signal with a frequency between 2110 and 2170 MHz,
      a WiFi 802.11b/g signal with a frequency between 2412 and 2484 MHz, or
      a harmonic radio frequency signal at 3150 MHz resulting from a GPS signal at 1575 MHz.

8. The method of claim 1, wherein the synthesizer signal is generated outside a phase-locked loop.

9. The method of claim 8, wherein the phase-locked loop comprises a phase frequency detector, a charge pump, a loop filter, and a VCO, and wherein the synthesizer signal is generated from the VCO frequency using:
a first divider portion; and
a second divider portion configured to:
divide an output from the first divider portion by four; and
output the synthesizer signal.
10. The method of claim 1,
wherein the first frequency range comprises a lower-limit frequency, a first midpoint frequency, and an upper-limit frequency,
wherein the lower-limit frequency of the first frequency range and the first upper-limit frequency of the first frequency range vary from the first midpoint frequency by a first percentage amount;
wherein a second midpoint frequency lies half way between a lower-limit frequency of the second frequency range and an upper-limit frequency of the third frequency range,
wherein the lower-limit frequency of the second frequency range and the third upper-limit frequency of the third frequency range vary from the second midpoint frequency by a second percentage amount, and
wherein the first percentage amount is less than the second percentage amount.
11. A device comprising:
a frequency modulation (FM) receiver, wherein the FM receiver includes:
a voltage-controlled oscillator (VCO) that is adaptable to output a VCO signal having a VCO frequency; and
a programmable output divider that receives the VCO signal and divides the VCO frequency by a divisor value selected from a set of divisor values to output a synthesizer signal;
wherein each of a first divisor value and a second divisor value of the set of divisor values is an integer multiple of four;
wherein, when the divisor value is the first divisor value, a synthesizer frequency of the synthesizer signal varies over a first synthesizer range;
wherein, when the divisor value is the second divisor value, the synthesizer signal varies over a second synthesizer range; and
wherein the first synthesizer range and the second synthesizer range are substantially contiguous.
12. The device of claim 11,
wherein the VCO outputs the VCO frequency over a VCO frequency range having a lower-limit frequency, a midpoint frequency, and an upper-limit frequency, and
wherein the upper-limit frequency and the lower-limit frequency vary from the midpoint frequency by no more than plus or minus seven percent respectively.
13. The device of claim 11, wherein the VCO frequency ranges from between 2.7 GHz to 3.2 GHz.
14. The device of claim 11, further comprising a radio frequency (RF) receiver.
15. The device of claim 14, wherein the RF receiver has a voltage-controlled oscillator with a first inductor, wherein the VCO of the FM receiver has a second inductor, and wherein the first inductor is within five centimeters of the second inductor.
16. The device of claim 14, wherein the RF receiver receives:
a CDMA 450 signal with a frequency between 421 and 493 MHz,
a GSM/CDMA 850 signal with a frequency between 869 and 894 MHz,
a GSM 900 signal with a frequency between 925 and 980 MHz,
a GSM 1800 signal with a frequency between 1805 and 1880 MHz,
a GSM/CDMA/WCDMA 1900 signal with a frequency between 1930 and 1990 MHz, or
a WCDMA 2100 signal with a frequency between 2110 and 2170 MHz.
17. The device of claim 14, wherein the RF receiver and the FM receiver are integrated onto a single integrated circuit and wherein the RF receiver has a voltage-controlled oscillator that generates a second VCO signal while the VCO of the FM receiver is generating the VCO signal.
18. The device of claim 11, wherein the VCO includes an inductor connected in parallel to a plurality of switched capacitors and wherein the VCO frequency is adjusted by switching one or more capacitors of the plurality of capacitors.
19. A non-transitory computer-readable medium having instructions stored thereon for execution by at least one computer, the instructions executable by the at least one computer to:
generate a voltage-controlled oscillator (VCO) signal having a VCO frequency that varies over a first frequency range, wherein the VCO signal is generated by a frequency modulation (FM) receiver; and
generate a synthesizer signal by dividing the VCO frequency by a divisor value selected from a set of divisor values including a first divisor value and a second divisor value;
wherein, when the divisor value is the first divisor value, a synthesizer frequency of the synthesizer signal varies over a second frequency range;
wherein, when the divisor value is the second divisor value, the synthesizer frequency of the synthesizer signal varies over a third frequency range;
wherein the second frequency range and the third frequency range are substantially contiguous; and
wherein each of the first divisor and the second divisor is an integer multiple of four.
20. The non-transitory computer-readable medium of claim 19,
wherein, when the divisor value is a third divisor value of the set of divisor values, the synthesizer frequency of the synthesizer signal varies over a fourth frequency range;
wherein a lower-limit frequency of the fourth frequency range is approximately equal to an upper-limit frequency of the third frequency limit;
wherein a lower-limit frequency of the second frequency range is approximately 76.0 MHz and an upper-limit frequency of the fourth frequency range is approximately 108.0 MHz; and
wherein the third divisor value is an integer multiple of four.
21. The non-transitory computer-readable medium of claim 19, wherein the instructions further comprise programming a programmable output divider with the first divisor value before the at least one computer generates the synthesizer signal with the synthesizer frequency that varies over the second frequency range and wherein the first divisor value is thirty-two and the second divisor value is twenty-eight.
22. An apparatus comprising:
a frequency modulation (FM) receiver that generates a synthesizer signal, wherein the FM receiver includes:
means for generating a first voltage-controlled oscillator (VCO) signal having a first VCO frequency; and means for dividing the first VCO frequency by a divisor value of a set of divisor values and outputting the synthesizer signal;

wherein each of a first divisor value and a second divisor value of the set of divisor values is an integer multiple of four;

wherein, when the divisor value is the first divisor value, a synthesizer frequency of the synthesizer signal varies over a first synthesizer range;

wherein, when the divisor value is a the second divisor value, the synthesizer signal varies over a second synthesizer range; and wherein the first synthesizer range and the second synthesizer range are substantially contiguous.

23. The apparatus of claim 22, wherein FM receiver further includes means for selecting the divisor value from the set of divisor values.

24. The apparatus of claim 22, wherein the set of divisor values includes at least three different divisor values that are each different integer multiples of four.

25. The apparatus of claim 22, further comprising:
a radio frequency (RF) receiver including:
means for generating a second VCO signal having a second VCO frequency;
wherein the first VCO frequency is within a first frequency range and the second VCO frequency is within a second frequency range;
wherein the first frequency range does not overlap the second frequency range, and
wherein the RF receiver receives:
a CDMA 450 signal with a frequency between 421 and 493 MHz,
a GSM/CDMA 850 signal with a frequency between 869 and 894 MHz,
a GSM 900 signal with a frequency between 925 and 980 MHz,
a GSM 1800 signal with a frequency between 1805 and 1880 MHz,
a GSM/CDMA/WCDMA 1900 signal with a frequency between 1930 and 1990 MHz,
a WCDMA 2100 signal with a frequency between 2110 and 2170 MHz,
a WiFi 802.11b/g signal with a frequency between 2412 and 2484 MHz, or
a harmonic radio frequency signal at 3150 MHz resulting from a GPS signal at 1575 MHz.

26. The apparatus of claim 22, wherein the first VCO frequency is within a VCO frequency range having a lower-limit frequency, an upper-limit frequency, and a midpoint frequency, and wherein the upper-limit frequency of the VCO frequency range and the lower-limit frequency of the VCO frequency range vary from the midpoint frequency of the VCO frequency range by less than plus or minus seven percent respectively.

27. A method comprising:
generating a voltage-controlled oscillator (VCO) signal having a VCO frequency that varies over a VCO frequency range, wherein the VCO signal is generated by a frequency modulation (FM) receiver;
generating a synthesizer signal by dividing the VCO frequency by a divisor value selected from a set of divisor values, wherein the set of divisor values includes a first divisor value, a second divisor value, and a third divisor value that are each a different integer multiple of four;
wherein, when the divisor value is the first divisor value, a synthesizer frequency of the synthesizer signal varies over a first frequency range;
wherein, when the divisor value is the second divisor value, the synthesizer frequency of the synthesizer signal varies over a second frequency range;
wherein, when the divisor value is the third divisor value, the synthesizer frequency of the synthesizer signal varies over of a third frequency range; and
wherein of the first frequency range, the second frequency range, and the third frequency range are each a different frequency range.

28. The method of claim 27, wherein the set of divisor values comprises five different divisor values.

29. The method of claim 27, wherein the set of divisor values is limited to the first divisor value, the second divisor value, and the third divisor value and wherein the first frequency range, the second frequency range, and the third frequency range are substantially contiguous.

30. The method of claim 27, wherein the VCO frequency range includes a lower-limit frequency that is greater than 2.7 GHz and an upper-limit frequency that is less than 3.2 GHz.

31. The method of claim 27, wherein the VCO frequency range includes a lower-limit frequency, a midpoint frequency, and an upper-limit frequency, and wherein the upper-limit frequency of the first frequency range and the lower-limit frequency of the first frequency range vary from the midpoint frequency by no more than plus or minus three and a half percent, respectively.

32. The method of claim 27, further comprising:
receiving a first signal via the FM receiver; and
receiving a second signal via a radio frequency (RF) receiver;
wherein the RF receiver generates a second VCO signal with a frequency that does not fall within the VCO frequency range, and
wherein the RF receiver receives:
a CDMA 450 signal with a frequency between 421 and 493 MHz,
a GSM/CDMA 850 signal with a frequency between 869 and 894 MHz,
a GSM 900 signal with a frequency between 925 and 980 MHz,
a GSM 1800 signal with a frequency between 1805 and 1880 MHz,
a GSM/CDMA/WCDMA 1900 signal with a frequency between 1930 and 1990 MHz,
a WCDMA 2100 signal with a frequency between 2110 and 2170 MHz, a WiFi 802.11b/g signal with a frequency between 2412 and 2484 MHz, or
a harmonic radio frequency signal at 3150 MHz resulting from a GPS signal at 1575 MHz.

33. The method of claim 27, wherein the VCO frequency range includes a plurality of sub-ranges and wherein each sub-range of the plurality of sub-ranges corresponds to a different divisor value of the set of divisor values.

34. The method of claim 33, wherein each sub-range of the plurality of sub-ranges includes a corresponding lower-limit frequency and wherein the lower-limit frequency of each of the plurality of sub-ranges is the same frequency value.

* * * * *